United States Patent
Tsukamoto et al.

(10) Patent No.: US 10,640,097 B2
(45) Date of Patent: May 5, 2020

(54) ELECTRIC BRAKING DEVICE FOR VEHICLE

(71) Applicant: ADVICS CO., LTD., Kariya-shi, Aichi-ken (JP)

(72) Inventors: Shun Tsukamoto, Kariya (JP); Koichi Kokubo, Nagoya (JP)

(73) Assignee: ADVICS CO., LTD., Kariya-Shi, Aichi-Ken (JP)

( * ) Notice: Subject to any disclaimer, the term of this patent is extended or adjusted under 35 U.S.C. 154(b) by 103 days.

(21) Appl. No.: 15/546,128

(22) PCT Filed: Feb. 25, 2016

(86) PCT No.: PCT/JP2016/055669
§ 371 (c)(1),
(2) Date: Jul. 25, 2017

(87) PCT Pub. No.: WO2016/136893
PCT Pub. Date: Sep. 1, 2016

(65) Prior Publication Data
US 2018/0009420 A1    Jan. 11, 2018

(30) Foreign Application Priority Data
Feb. 25, 2015    (JP) .................................. 2015-034742

(51) Int. Cl.
*B60T 8/171*    (2006.01)
*B60T 8/172*    (2006.01)
(Continued)

(52) U.S. Cl.
CPC .............. *B60T 8/171* (2013.01); *B60T 1/005* (2013.01); *B60T 7/12* (2013.01); *B60T 8/00* (2013.01);
(Continued)

(58) Field of Classification Search
CPC ... B60T 8/171; B60T 8/00; B60T 8/17; B60T 8/172; B60T 7/12; B60T 13/74;
(Continued)

(56) References Cited

U.S. PATENT DOCUMENTS 5,043,649 A * 8/1991 Murakami .............. F16N 29/04
188/266.4
6,464,308 B2 * 10/2002 Kubota ................. B60T 13/741
188/1.11 E
(Continued)

FOREIGN PATENT DOCUMENTS

JP    2000-16279 A    1/2000

OTHER PUBLICATIONS

International Search Report (PCT/ISA/210) dated May 17, 2016, by the Japanese Patent Office as the International Searching Authority for International Application No. PCT/JP2016/055669.
(Continued)

*Primary Examiner* — Melody M Burch
(74) *Attorney, Agent, or Firm* — Buchanan Ingersoll & Rooney PC

(57) ABSTRACT

Provided is an electric braking device that transmits power generated by an electric motor MTR to a pressing member PSN and causes pressing force to be generated by the pressing member PSN with respect to a friction member MSB. Hysteresis characteristics in the relation between the power supply amount to the electric motor and the pressing force of the pressing member are detected each time a predetermined point in time arrives. Upon determination of a "holding state in which the pressing force is held constant", a minimum value for a power supply amount that makes it possible to maintain the current pressing force is obtained on the basis of the most recently detected hysteresis characteristics and the power supply amount is set to a value
(Continued)

determined on the basis of the obtained minimum value for the power supply amount.

11 Claims, 6 Drawing Sheets

(51) Int. Cl.
| | |
|---|---|
| *B60T 13/74* | (2006.01) |
| *B60T 8/00* | (2006.01) |
| *B60T 8/17* | (2006.01) |
| *B60T 1/00* | (2006.01) |
| *F16D 63/00* | (2006.01) |
| *B60T 7/12* | (2006.01) |
| *F16D 65/18* | (2006.01) |
| *F16D 66/00* | (2006.01) |
| *F16D 121/24* | (2012.01) |
| *F16D 55/226* | (2006.01) |
| *F16D 125/40* | (2012.01) |

(52) U.S. Cl.
CPC ............... *B60T 8/17* (2013.01); *B60T 8/172* (2013.01); *B60T 13/74* (2013.01); *B60T 13/741* (2013.01); *F16D 63/006* (2013.01); *F16D 65/18* (2013.01); *F16D 66/00* (2013.01); *F16D 55/226* (2013.01); *F16D 65/183* (2013.01); *F16D 2066/001* (2013.01); *F16D 2121/24* (2013.01); *F16D 2125/40* (2013.01)

(58) Field of Classification Search
CPC ........ B60T 13/741; B60T 1/005; F16D 65/18; F16D 65/00; F16D 65/183; F16D 66/00; F16D 55/226; F16D 2121/24; F16D 2125/40; F16D 2066/001
See application file for complete search history.

(56) References Cited

U.S. PATENT DOCUMENTS

| | | | |
|---|---|---|---|
| 2003/0066719 A1* | 4/2003 | Watanabe | B60T 1/005 188/72.7 |
| 2004/0212249 A1* | 10/2004 | Yamaguchi | B60T 13/02 303/122.04 |
| 2005/0217952 A1* | 10/2005 | Usui | F16D 65/18 188/265 |
| 2005/0258683 A1* | 11/2005 | Yamaguchi | B60T 1/005 303/89 |
| 2008/0093179 A1* | 4/2008 | Jager | B60L 7/22 188/72.2 |

OTHER PUBLICATIONS

Written Opinion (PCT/ISA/237) dated May 17, 2016, by the Japanese Patent Office as the International Searching Authority for International Application No. PCT/JP2016/055669.

* cited by examiner

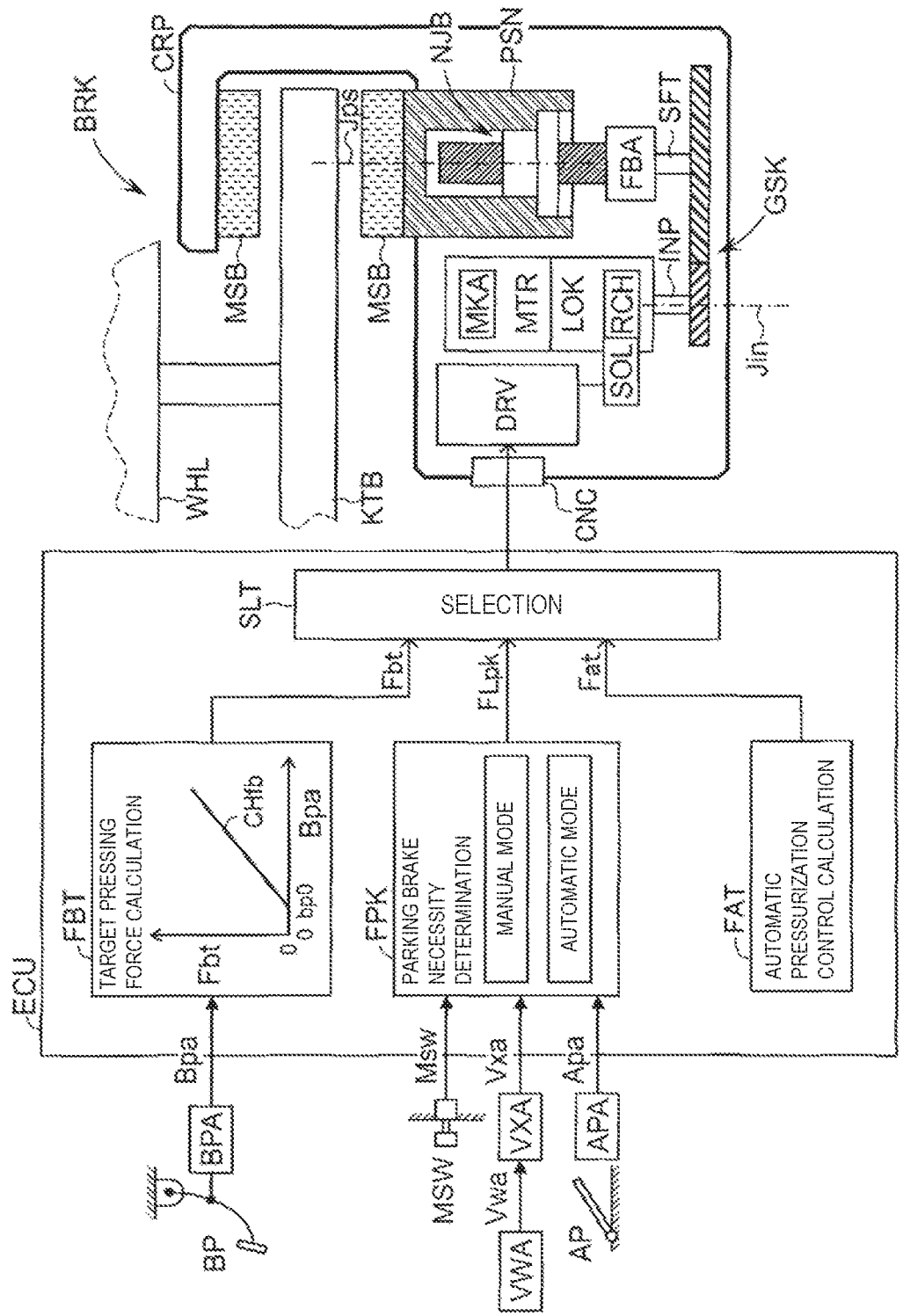
[FIG. 1]

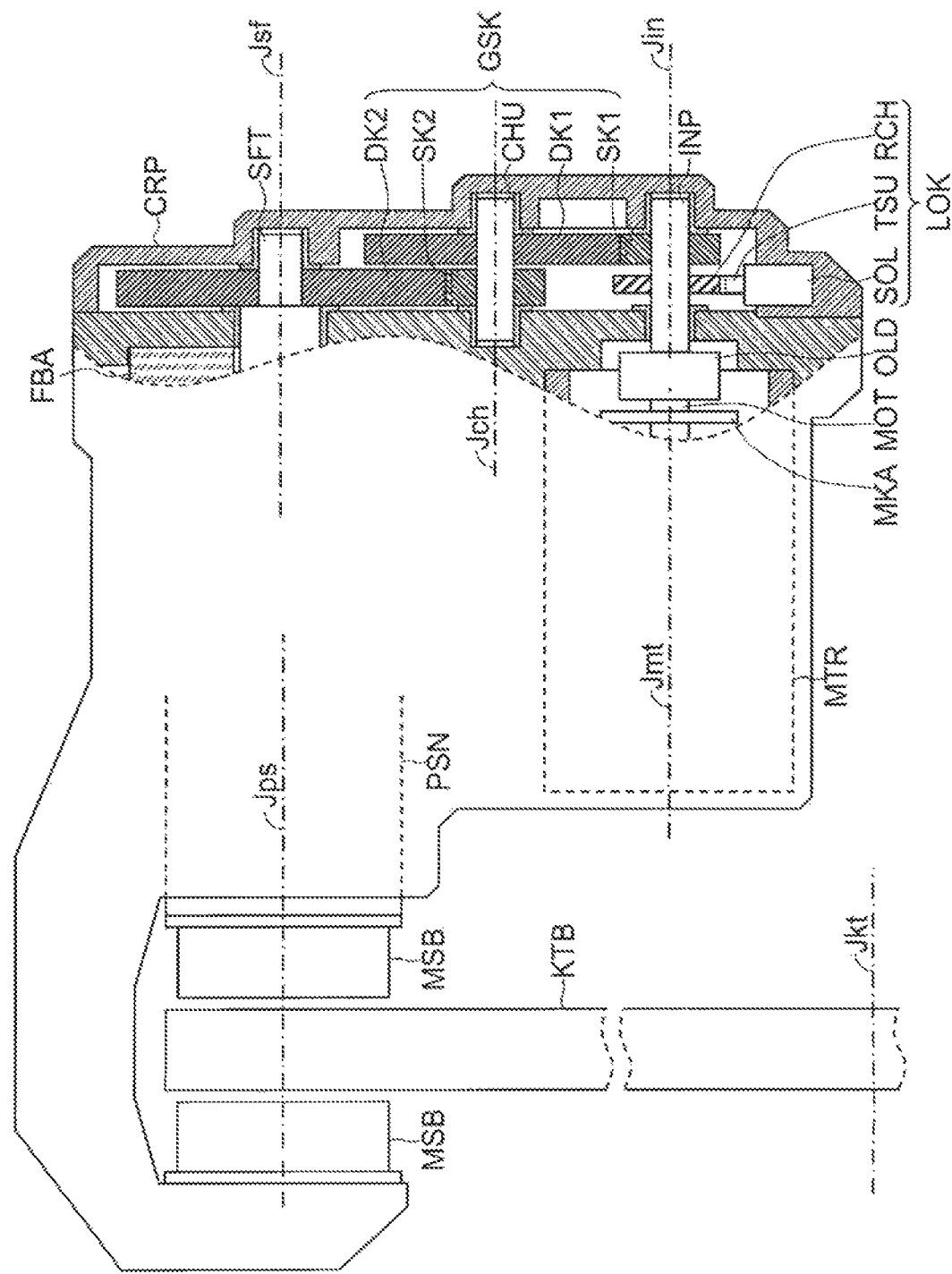

[FIG. 3]
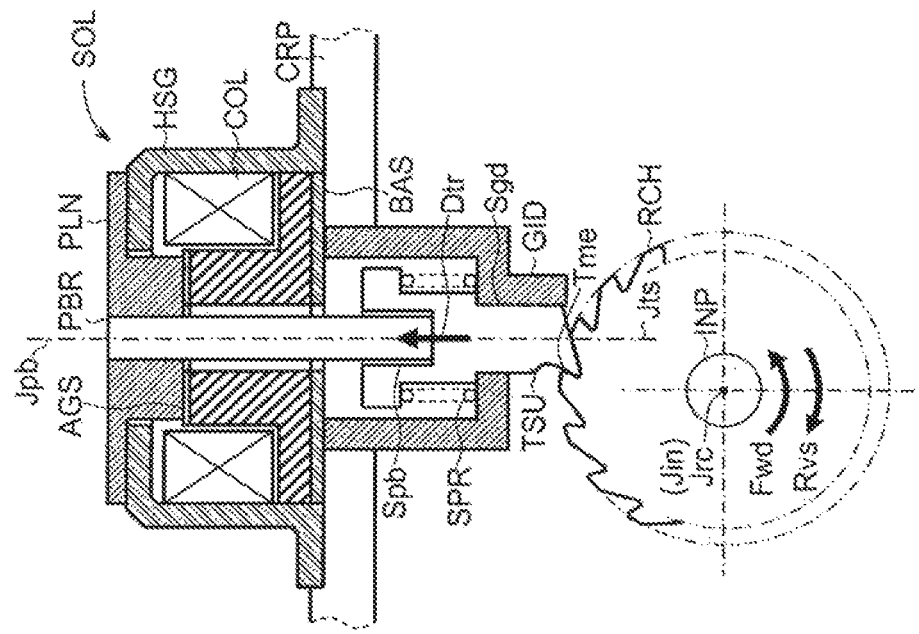
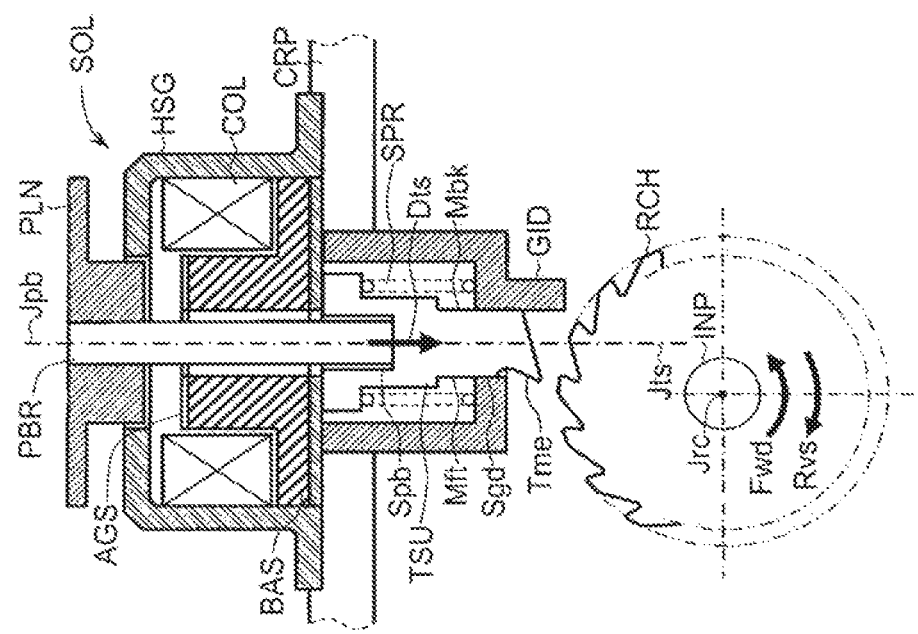

[FIG. 4]
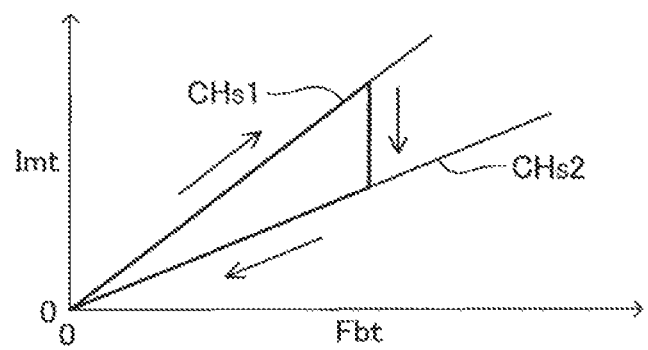
[FIG. 5]
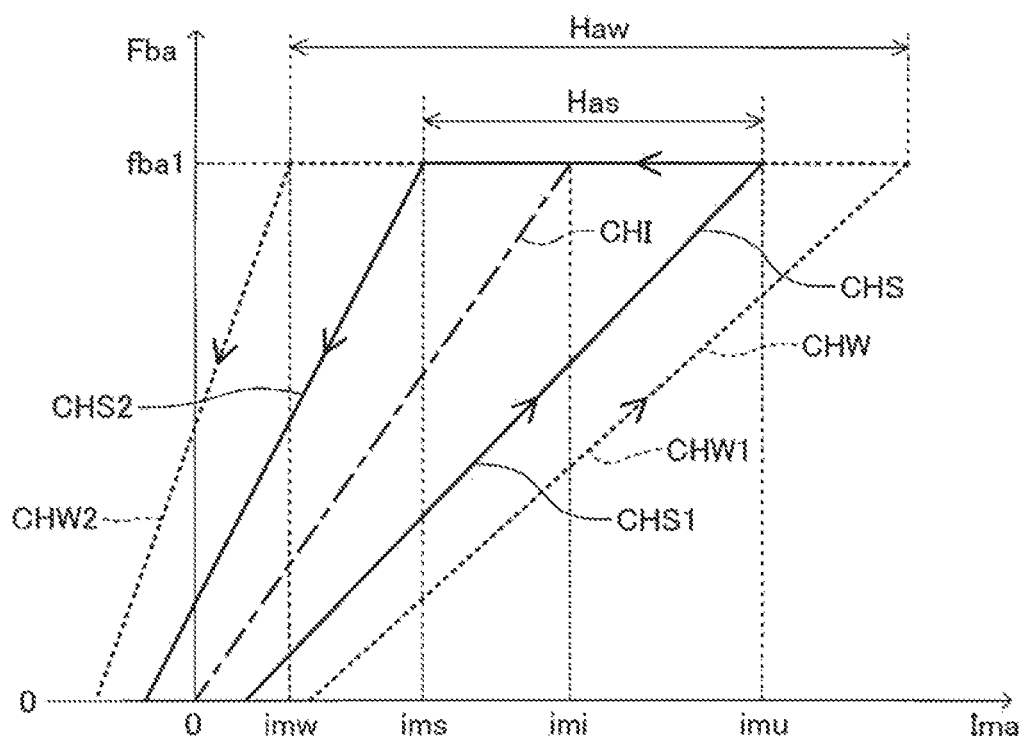

[FIG. 6]
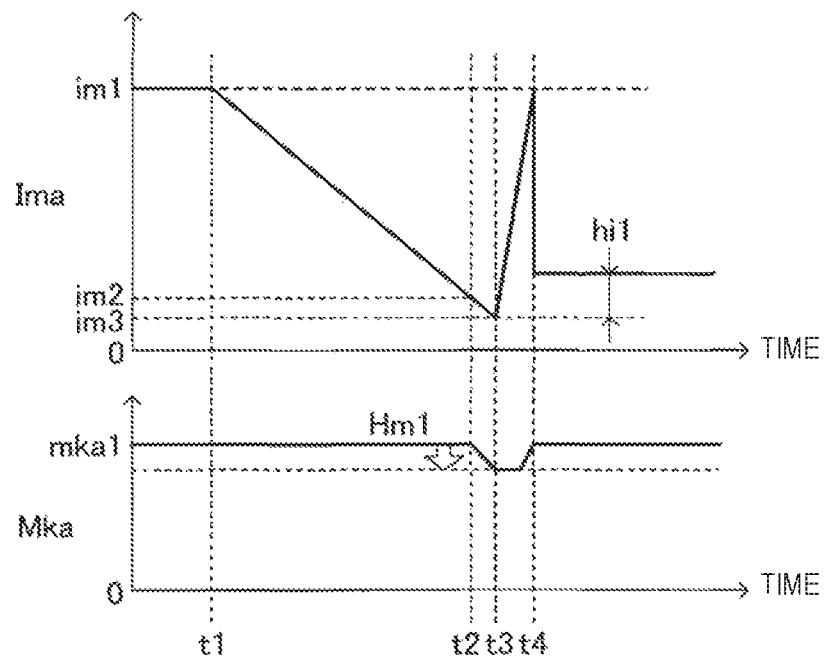
[FIG. 7]
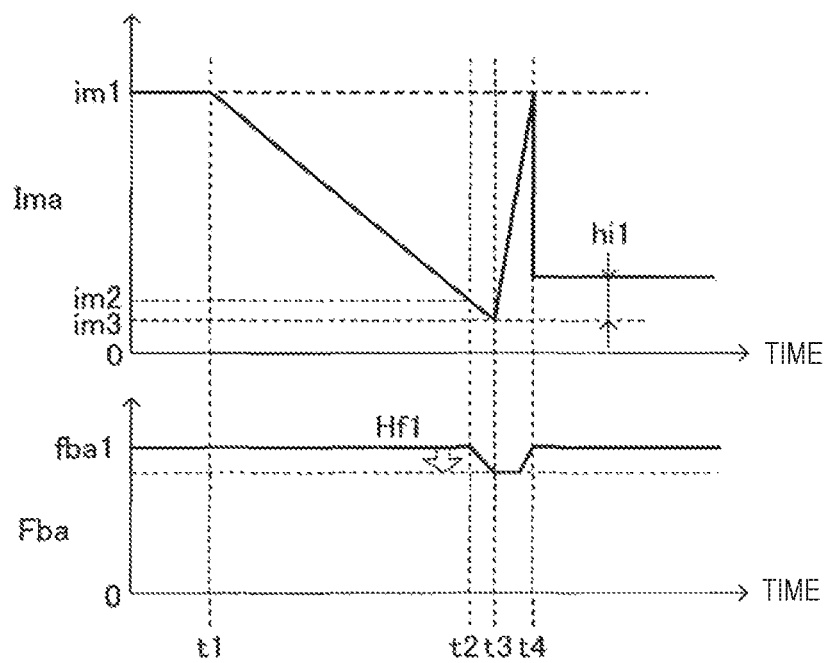

[FIG. 8]
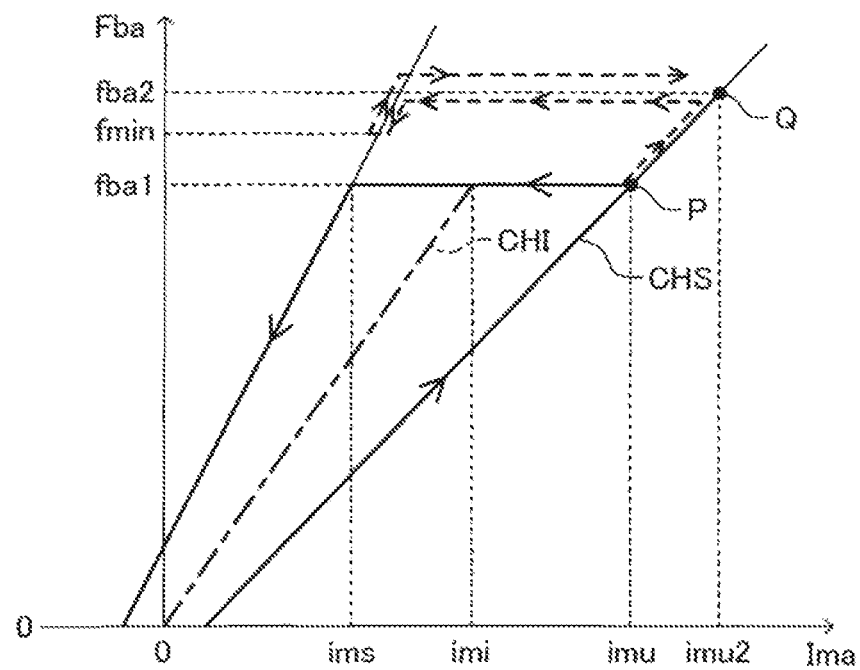
[FIG. 9]
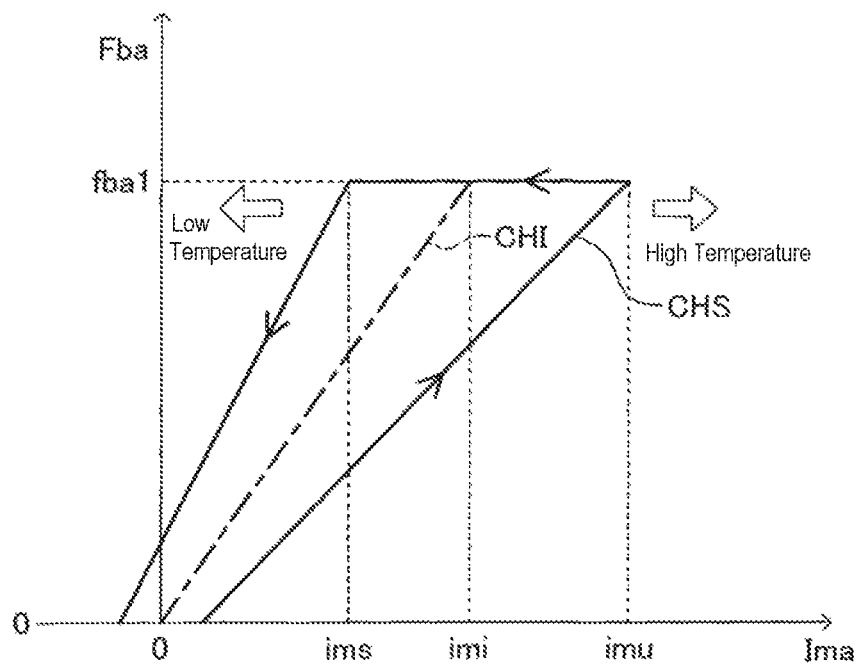

ELECTRIC BRAKING DEVICE FOR VEHICLE

TECHNICAL FIELD

The present invention relates to an electric braking device for a vehicle.

BACKGROUND ART

A conventional electric braking device for a vehicle includes an "electric motor generating power", a "pressing member (brake piston) pressing a friction member (pad) against a rotating member (brake disk) integrally rotating together with a wheel of a vehicle", a "power transmitting mechanism transmitting the power generated by the electric motor to the pressing member to generate pressing force of the pressing member with respect to the friction member", and a "control means controlling a power supply amount for the electric motor such that the pressing force depending on an operation of a brake operation member (brake pedal) of the vehicle by a driver" (for example, see Patent Literature 1).

In the device described in the above literature, a hysteresis characteristics in a relationship between the "power supply amount for the electric motor" and the "pressing force of the pressing member" is acquired in advance. In the literature, when braking force having an almost constant magnitude continues for a predetermined time or longer, the power supply amount is reduced in consideration of the hysteresis characteristics within a range in which the braking force can be kept. In this manner, a current consumption in the device can be reduced.

The hysteresis characteristics may successively vary because aging, a change in temperature, and the like of a sliding part in a power transmitting mechanism causes a frictional coefficient of the sliding part to vary. However, the literature does not describe a variation in hysteresis characteristic at all.

When a range (range of a power supply amount at which pressing force can be kept) of actual hysteresis characteristics is larger than a range of the hysteresis characteristics acquired in advance, a power supply amount is reduced but a margin to be able to further reduce the power supply amount within the range in which the braking force can be kept is left. In this case, there is a margin to be able to further reduce a current consumption of the device. On the other hand, when the range of the actual hysteresis characteristics is smaller than the range of the hysteresis characteristics acquired in advance, the power supply amount might be reduced over the range in which the braking force can be kept. In this case, a situation in which the braking force cannot be kept (the braking force reduces) may occur.

CITATION LIST

Patent Literature

Patent Literature 1: Unexamined Japanese Patent Publication No. 2000-16279

SUMMARY OF INVENTION

The present invention has been made to cope with the above problems and has as its object to provide an electric braking device for a vehicle which properly sets a power supply amount for an electric motor in a pressing force keeping state even though the hysteresis characteristics vary to make it possible to surely reduce a current consumption of the device without lowering braking force.

The electric braking device for a vehicle according to the present invention includes: an electric motor (MTR) generating power; a pressing member (PSN) pressing a friction member (MSB) against a rotating member (KTB) integrally rotating together with a wheel of the vehicle; a power transmitting mechanism (INP, GSK, SFT, NJB) configured to transmit the power generated by the electric motor to the pressing member and cause pressing force (Fba) to be generated by the pressing member with respect to the friction member; and a control means (ECU, DRV) controlling a power supply amount (Ima) for the electric motor such that, of pressing force determined on the basis of an operation of a brake operation member (BP) of the vehicle by a driver, pressing force determined on the basis of a parking brake function (FPK), and pressing force determined by an automatic pressurization control means (FAT) generating braking force regardless of the operation of the brake operation member, selected pressing force serving as pressing force selected on the basis of conditions of the vehicle is generated.

As characteristics of the electric braking device according to the present invention, the control means includes a determination means determining whether a keeping state in which the pressing force is kept constant is set, and the control means, each time a predetermined time point comes, detects hysteresis characteristics in a relationship between the power supply amount and the pressing force, and, when it is determined that the keeping state is set, on the basis of the detected hysteresis characteristics, acquires a minimum value of the power supply amount at which the current pressing force can be kept, and sets the power supply amount for the electric motor to a value determined on the basis of the acquired minimum value of the power supply amount.

According to this, each time the predetermined time point comes, the hysteresis characteristics used for setting the power supply amount in the keeping state are updated. Thus, the minimum value of the power supply amount within a range in which the present braking force can be kept can be relatively correctly acquired, and, on the basis of the minimum value of the power supply amount relatively correctly acquired, a power supply amount in the keeping state is determined. As a result, the power supply amount is properly set in the keeping state to make it possible to reliably reduce a current consumption of the device without lowering braking force.

The minimum value of the power supply amount, for example, in the keeping state, can be obtained by performing an automatic hysteresis characteristic detection operation. More specifically, for example, the power supply amount is gradually reduced to reduce the pressing force and on the basis of a change of a detected position (position of the electric motor or a power transmitting member included in the power transmitting mechanism), the minimum value of the power supply amount can be acquired. Alternatively, the power supply amount is gradually reduced to reduce the pressing force, and, on the basis of a change of the detected pressing force, the minimum value of the power supply amount can be acquired.

In this manner, when the automatic hysteresis characteristic detection operation is performed, in order to acquire the minimum value of the power supply amount, braking force (pressing force) is actually reduced from a "kept value". When the braking force reduces as described above, even though the power supply amount is merely set to the acquired minimum value (or a value determined on the basis of the minimum value) of the power supply amount, a situation in which a reduction in braking force still continues may occur.

In consideration of this point, after the minimum value of the power supply amount is acquired, the power supply amount for the electric motor is increased to return to a "value obtained when it is determined that the pressing force is in the keeping state". Thereafter, the power supply amount for the electric motor is preferably set to a value determined on the basis of the acquired minimum value of the power supply amount. According to this, after the automatic hysteresis characteristic detection operation is performed, the reducing braking force can be reliably returned to a "kept value".

The electric braking device according to the present invention may include a "pressing force increasing means which executes pressing force increasing control which adjusts the pressing force to a value larger than the selected pressing force". In this case, the control means, when it is determined that the keeping state is set, executes the pressing force increasing control. Thereafter, the automatic hysteresis characteristic detection operation is executed, and, in execution of the automatic hysteresis characteristic detection operation, the power supply amount is preferably adjusted such that the pressing force is not lower than the selected pressing force. In this manner, when the automatic hysteresis characteristic detection operation is performed, a situation in which the braking force (pressing force) is lower than the selected pressing force can be prevented from occurring.

In the electric braking device according to the present invention, when the electric braking device is mounted on each wheel, when it is determined that the keeping state is set, the automatic hysteresis characteristic detection operation is preferably prevented from being simultaneously executed to all the wheels.

As described above, when the automatic hysteresis characteristic detection operation is performed on a certain wheel, in order to acquire the minimum value of the power supply amount, braking force for the wheel is actually reduced from the "kept value". Thus, when the automatic hysteresis characteristic detection operation is simultaneously performed on all the wheels of a vehicle, a reduction in braking force for the entire vehicle increases. In contrast to this, according to the configuration, the automatic hysteresis characteristic detection operation is not simultaneously executed on all the wheels of the vehicle. Thus, a reduction in braking force for an entire vehicle can be relatively reduced.

In the electric braking device according to the present invention, only when it is determined that the vehicle stops, the automatic hysteresis characteristic detection operation (control which reduces the power supply amount to acquire the minimum value of the power supply amount) is preferably executed.

As described above, when the automatic hysteresis characteristic detection operation is performed, the braking force is actually reduced from the "kept value". Thus, when the automatic hysteresis characteristic detection operation is performed while the vehicle is traveling (in particular, during deceleration by a normal braking operation), an occupant of the vehicle easily is aware that the braking force reduces. The above configuration is based on such knowledge. According to this, a "situation in which the occupant of the vehicle is aware that the automatic hysteresis characteristic detection operation is performed while the vehicle is traveling" can be prevented from occurring.

The control means of the electric braking device according to the present invention, when it is determined that the keeping state is set, may also be configured such that the power supply amount for the electric motor is set to a value determined on the basis of a predetermined relationship (CHI, to be referred to as "reference characteristics" hereinafter) being free from a hysteresis between the power supply amount and the pressing force obtained on the basis of specifications of the electric motor and the power transmitting mechanism.

Due to a variation or the like of a frictional coefficient of a sliding part in the power transmitting mechanism, the hysteresis characteristics vary centering around the "reference characteristics". Thus, a "power supply amount corresponding to current pressing force in the reference characteristics" must be larger than the "minimum value of the power supply amount within a range in which the current pressing force can be kept when the hysteresis characteristics are considered. In other words, when the power supply amount in the keeping state is set to the "value corresponding to the current pressing force in the reference characteristics", a situation in which pressing force is lower than the current pressing force can be reliably prevented from occurring. In addition, in comparison with a case in which the power supply amount in the keeping state is kept at a value close to the "maximum value of the power supply amount within the range in which the present pressing force can be kept", a current consumption of the device can be reliably reduced. The above configuration is based on such knowledge.

In this case, the power supply amount for the electric motor set when it is determined that the keeping state is set is preferably corrected on the basis of the acquired temperature of the electric motor.

In general, the higher the temperature of the electric motor is, the lower a "ratio of an output torque to a power supply amount" in the electric motor (so-called a torque constant) becomes. This is because, the higher the temperature of the electric motor is, the lower a magnetic flux density of a permanent magnet in the electric motor becomes. Thus, the temperature of the electric motor may allow the "reference characteristics" to vary. Therefore, according to the above configuration, regardless of the temperature of the electric motor, a power supply amount in the keeping state can be correctly set on the basis of correct "reference characteristics".

BRIEF DESCRIPTION OF THE DRAWINGS

FIG. 1 is an overall diagram of an electric braking device for a vehicle according to an embodiment of the present invention.

FIG. 2 is a partially cutaway view for mainly explaining a power transmitting mechanism.

FIG. 3 is a main sectional view for explaining a parking brake mechanism (lock mechanism) LOK.

FIG. 4 is a diagram showing a map regulating a relationship between a target pressing force and a target power supply amount.

FIG. 5 is a graph for explaining a manner of a variation in hysteresis characteristic in a relationship between a power supply amount and a pressing force.

FIG. 6 is a time chart showing an example obtained when an automatic hysteresis characteristic detection operation is performed.

FIG. 7 is a time chart showing another example obtained when an automatic hysteresis characteristic detection operation is performed.

FIG. 8 is a diagram corresponding to FIG. 5 and showing an example obtained when the automatic hysteresis characteristic detection operation is performed while a parking brake is operating.

FIG. 9 is a diagram corresponding to FIG. 5 and showing a manner of a variation in reference characteristic (therefore, hysteresis characteristic) by a temperature of an electric motor.

DESCRIPTION OF EMBODIMENT

An electric braking device for a vehicle according to an embodiment of the present invention will be described below with reference to the accompanying drawings.
(Configuration)

As shown in FIG. 1, a vehicle having the electric braking device includes a brake operation member BP, an operation amount acquiring means BPA, an acceleration operation member AP, an acceleration operation amount acquiring means APA, a parking brake switch MSW, a wheel speed acquiring means VWA, a vehicle speed acquiring means VXA, an electronic control unit ECU, a braking means (brake actuator) BRK, a rotating member (brake disk) KTB, and a friction member MSB. The electric braking device is disposed for each of the wheels.

The brake operation member (for example, a brake pedal) BP is a member operated by a driver to decelerate the vehicle. Depending on an operation of the brake operation member BP, braking torques of wheels WHL are adjusted by the braking means BRK. The brake operation amount acquiring means BPA is disposed in the brake operation member BP. The BPA acquires (detects) an operation amount (brake operation amount) Bpa of the brake operation member BP by the driver.

As the brake operation amount acquiring means BPA, at least one of a sensor (brake pedal stepping force sensor) detecting operation force of the brake operation member BP and a sensor (brake pedal stroke sensor) detecting a displacement amount of the BP is employed. Thus, the brake operation amount Bpa is calculated on the basis of at least one of brake pedal stepping force and a brake pedal stroke.

The acceleration operation member (for example, an accelerator pedal) AP is a member operated by the driver to accelerate the vehicle. The acceleration operation amount acquiring means APA is disposed in the acceleration operation member AP. The APA acquires (detects) an operation amount (acceleration operation amount) APa of the acceleration operation member AP by the driver. As the APA, a sensor (throttle position sensor) detecting a throttle position of an engine and a sensor (accelerator pedal stepping force sensor and accelerator pedal stroke sensor) detecting operation force and/or a displacement amount of the acceleration operation member AP are employed. Thus, an acceleration operation amount Apa is calculated on the basis of at least one of a throttle position, accelerator pedal stepping force, and an accelerator pedal stroke.

The parking brake switch (also simply called a switch) MSW is a manual switch operated by the driver to output a signal Msw to turn on/off (ON/OFF) the switch MSW. The Msw in an on (ON) state designates a parking brake to be operated, and the Msw in an off (OFF) state designates the parking brake to be canceled.

The vehicle speed acquiring means VXA acquires (detects) a speed (vehicle speed) Vxa of a vehicle. The vehicle speed Vxa can be calculated on the basis of a detection signal (wheel speed) Vwa from the wheel speed acquiring means VWA and a known method. For example, the maximum speed of the rotating speeds Vwa of the wheels may be calculated as the vehicle speed Vxa.

The brake operation amount Bpa, the acceleration operation amount Apa, the vehicle speed Vxa, and the designation signal Msw are input to the electronic control unit ECU. The Bpa, the Apa, the Vxa, and the Msw are calculated or acquired by another electronic control unit. The calculated values (signals) may be transmitted to the electronic control unit ECU through a communication bus.

The electronic control unit ECU is fixed to the vehicle body. In a CPU of the electronic control unit ECU, a target pressing force calculation block FBT, a parking brake necessary/unnecessary determination block FPK, an automatic pressurization control calculation block FAT, and a selecting block SLT are programmed.

In the FBT, on the basis of the Bpa and a preset calculation map CHfb, a target pressing force Fbt related to force (pressing force) pressing the rotating member (brake disk) KTB by the friction member (brake pad) MSB is calculated. The target pressing force Fbt may be corrected on the basis of vehicle conditions. For example, when the vehicle stops, on the basis of a gradient of a road surface on which the vehicle stops, a lower limit of pressing force necessary to keep the stop state is calculated, and the target pressing force Fbt may be limited such that the target pressing force Fbt does not exceed a limited value set to be slightly larger than the calculated lower limit of the pressing force. In this case, in comparison with a case in which the target pressing force Fbt is not corrected, the opportunity to keep the pressing force, i.e., as will be described later, the opportunity to be able to reduce a power supply amount for an electric motor MTR by detecting hysteresis characteristics can be increased. The calculated Fbt is transmitted to a drive circuit DRV fixed to a wheel side through the SLT.

In the FPK, on the basis of the Msw or the like, it is determined whether a parking brake is necessary/unnecessary. More specifically, a signal FLpk to designate the parking brake to be operated or canceled is determined. "FLpk=0" indicates an unnecessary state of the parking brake, and "FLpk=1" indicates a necessary state of the parking brake. The designation signal FLpk is transmitted to the drive circuit DRV through the SLT.

In a manual mode, on the basis of the operation signal Msw of the manual switch MSW operated by a driver, it is determined whether the parking brake is necessary or unnecessary. For example, the off state of the switch MSW selects the "unnecessary state (FLpk=0) of the parking brake", and the on state of the MSW selects the "necessary state (FLpk=1) of the parking brake".

In an automatic mode, independently of an operation of the switch MSW by the driver, in conjunction with an operation or the like of the acceleration operation member (accelerator pedal) AP, it is automatically determined whether the parking brake is necessary or unnecessary (operated or canceled). More specifically, in the automatic mode, on the basis of the vehicle speed Vxa, the acceleration operation amount Apa, and the like, it is determined whether the parking brake is necessary or unnecessary.

For example, while the vehicle is traveling (Vxa>0), the unnecessary state (FLpk=0) of the parking brake is determined. When the vehicle stops (i.e., Vxa becomes zero), the necessary state of the parking brake is determined to switch the control flag FLpk from "0" to "1". When the driver operates the acceleration operation member AP to make the acceleration operation amount Apa larger than a predetermined value ap1, the unnecessary state of the parking brake is determined to switch the control flag FLpk from "1" to "0".

In FAT, in order to execute automatic pressurization control generating braking force (pressing force) regardless of the operation of the brake operation member BP (even though the BP is not operated), on the basis of signals or the like from various sensors showing conditions of the vehicle, target pressing force Fat related to pressing force is calculated. The automatic pressurization control, typically, is control executed for suppression of skid or slip of the wheels, determination (initial check) whether the device is normal, suppression (hill-hold control) of crawling down of the vehicle on a slope road (climbing road), execution of an automatic hysteresis characteristic detection operation (will be described later), and the like. The calculated Fat is transmitted to the drive circuit DRV through the SLT.

In the SLT, on the basis of the conditions of the vehicle, by one of known selecting means, any one of the signals Fbt, FLpk, and Fat is selected, and the selected signal is transmitted to the drive circuit DRV.

The braking means (brake actuator) BRK is disposed on each of the wheels WHL to give braking torque to the wheels WHL so as to generate braking force. The vehicle, when traveling, is decelerated by the BRK (functioning as a normal brake). When the vehicle stops, the BRK functions as a parking brake (pressing force increasing means) keeping the stopped state.

As the BRK, the configuration of a so-called disk-type braking device (disk brake) is exemplified. However, in this case, the friction member MSB is a brake pad, and the rotating member KTB is a brake disk. The braking means BRK may be a drum-type braking device (drum brake). In the drum brake, the friction member MSB is a brake shoe, and the rotating member KTB is a brake drum.

The braking means BRK includes a brake caliper CRP, the pressing member PSN, the electric motor MTR, a position acquiring means MKA, a decelerator GSK, a shaft member SFT, a screw member NJB, a pressing force acquiring means FBA, a parking brake lock mechanism LOK, and the drive circuit DRV.

The brake caliper (to also be simply referred to as a caliper) CRP is configured to clip the rotating member (brake disk) KTB through the two friction members (brake pads) MSB. The caliper CRP has a space therein, and various members (drive circuit DRV or the like) is stored in the space.

Inside the caliper CRP, a pressing member (brake piston) PSN is moved (forward or backward) with respect to the rotating member KTB. With the moving of the pressing member PSN, the friction member MSB is pressed against the rotating member KTB to generate frictional force. For example, the PSN has a cylindrical shape and has a central axis Jps. Thus, the PSN moves in the directions of the axis Jps.

The pressing member PSN is moved by the power of the electric motor MTR. More specifically, an output (rotating power around a motor shaft) of the electric motor MTR is transmitted to the shaft member SFT through the decelerator GSK. The rotating power (torque around the shaft axis) of the shaft member SFT is converted into linear power (thrust in axial directions of the pressing member) by the power converting member NJB, and the linear power is transmitted to the pressing member PSN. As a result, the pressing member PSN is moved (forward or backward) with respect to the rotating member KTB. In this case, the central axis Jps of the PSN coincides with the rotating axis of the SFT.

With the moving of the pressing member PSN, force (pressing force) pressing the rotating member KTB by the friction member MSB is adjusted. Since the rotating member KTB is fixed to each of the wheels WHL, frictional force is generated between the friction member MSB and the rotating member KTB to adjust the braking force of the wheels WHL.

The electric motor MTR is a power source to drive (move) the pressing member PSN. For example, as the electric motor MTR, a brush motor or brushless motor may be employed. In the rotating directions of the electric motor MTR, a normal rotating direction corresponds to a direction (direction in which pressing force increases and braking torque increases) in which the friction member MSB comes close to the rotating member KTB, and a reverse rotating direction corresponds to a direction (direction in which pressing force reduces and braking torque reduces) in which the friction member MSB comes away from the rotating member KTB.

The position acquiring means (for example, a rotating angle sensor) MKA acquires (detects) a position (for example, rotating angle) Mka of a rotor of the electric motor MTR. For example, the MKA is disposed inside the electric motor MTR and on a rotating axis Jmt of the MTR. The detected position (rotating angle) Mka is input to the drive circuit DRV.

An input member INP, the decelerator GSK, the shaft member SFT, and the screw member NJB configure a power transmitting mechanism to transmit power from the electric motor MTR to the pressing member PSN. The input INP is coaxially coupled to an output shaft MOT of the electric motor MTR through an Oldham's coupling OLD. The GSK decelerates the rotation of the INP to transmit the rotation to the SFT. By the interposition of the decelerator GSK, rotating torque of the SFT is increased to a value obtained by multiplying a rotating torque of the electric motor MTR by a reduction ratio (>1) of the GSK.

As shown in FIG. 2, as the decelerator GSK, a two-speed decelerator may be employed. In the example shown in FIG. 2, first-speed deceleration is performed by a "combination of a small-diameter gear SK1 fixed to the INP and a large-diameter gear DK1 fixed to an intermediate shaft CHU", and second-speed deceleration is performed by a "combination of a small-diameter gear SK2 fixed to the CHU and a large-diameter gear DK2 fixed to the SFT".

With reference to FIG. 1, the shaft member SFT is a rotating shaft member to transmit rotating power transmitted from the decelerator GSK to the screw member NJB. The screw member NJB is a power converting mechanism (rotating-linear motion converting member) converting rotating power from the shaft member SFT to linear power. For example, as the NJB, a sliding screw (trapezoidal thread or the like) or a rolling screw (ball screw or the like) may be employed.

The pressing force acquiring means (for example, pressing force sensor) FBA acquires (detects) force (pressing force) Fba pressing the friction member MSB by the pressing member PSN. The detected actual pressing force Fba is input to the drive circuit DRV. For example, the pressing force acquiring means FBA is disposed between the shaft member SFT and the caliper CRP. More specifically, the pressing force acquiring means FBA is disposed on the rotating shaft of the shaft member SFT and fixed to the caliper CRP.

In the example shown in FIGS. 1 and 2, as the power transmitting mechanism, a configuration transmitting the power from the electric motor MTR to the pressing member PSN by using only a mechanical coupling of a plurality of the power transmitting members is employed. However, a configuration transmitting the power from the electric motor MTR to the pressing member PSN by using the mechanical coupling of a plurality of the power transmitting members and a fluid pressure circuit (including a master cylinder) may be employed. More specifically, for example, a configuration in which the fluid pressure circuit including the master cylinder is interposed between the screw member NJB and the pressing member PSN to cause the screw member NJB to pressurize the master cylinder may be employed.

The parking brake mechanism (also called a lock mechanism) LOK is a mechanism which locks the reverse rotation of the electric motor MTR to exert a brake function (so-called parking brake) of keeping a stopped state of the vehicle. As a result, the pressed state of the rotating member KTB by the friction member MSB is kept.

As shown in FIGS. 2 and 3, the lock mechanism LOK may be disposed between the electric motor MTR and the decelerator GSK (i.e., coaxially with the electric motor MTR). In the example shown in FIGS. 2 and 3, the lock mechanism LOK includes a ratchet gear (to also be referred to as a ratchet) RCH, a claw member TSU, and a solenoid actuator (to be simply referred to as a solenoid) SOL.

The ratchet gear RCH is fixed to the input INP coaxially with the INP. The RCH has teeth each having directivity unlike a general gear (for example, a spur gear). The solenoid SOL is fixed to the caliper CRP. In a non-energization state of the solenoid SOL, biasing force of an elastic member (return spring) SPR keeps the claw member TSU at a position (engagement impossible position) where the claw member TSU is unable to be engaged with the ratchet gear RCH (see FIG. 3A).

On the other hand, in an energization state of the SOL, electromagnetic force causing a push bar PBR serving as a part of the solenoid SOL to press the claw member TSU toward the RCH is generated, and the TSU moves to a position (engagement possible position) where the claw member TSU is able to be engaged with the RCH while moving against the biasing force of the SPR and is kept at an engagement possible position (see FIG. 3B). In a state in which the pressing force Fba (>0) of the pressing member PSN is generated and the TSU is kept at the engagement possible position, when a distal end Tme of the TSU is engaged with the teeth of the RCH, rotational motion of the RCH in a reverse rotating direction Rvs becomes impossible. In this manner, moving of the pressing member PSN in a direction in which the pressing force Fba reduces becomes impossible. As a result, even when energization of the braking means BRK (electric motor MTR) is stopped, the pressing force Fba is kept to exert a parking brake function.

The drive circuit (electric circuit) DRV is an electric circuit (printed circuit board) driving the electric motor MTR and the solenoid actuator (to also be simply referred to as a solenoid) SOL. The DRV is disposed (fixed) inside the caliper CRP.

(Normal Brake Function)

A normal brake is a brake function of generating braking force depending on an operation of the brake operation member BP by a driver. The normal brake function is exerted by driving the electric motor MTR by the drive circuit DRV on the basis of the Fbt (corresponding to the selected pressing force) when the selecting block SLT selects the target pressing force Fbt.

More specifically, the DRV calculates a target power supply amount Imt on the basis of the target pressing force Fbt determined on the basis of the brake operation amount Bpa and preset calculation characteristics (calculation maps) CHs1 and CHs2 shown in FIG. 4. The target power supply amount Imt is a target value of a power supply amount for the electric motor MTR to achieve the target pressing force Fbt. As shown in FIG. 4, the calculation map of the Imt includes pressure-increasing side characteristics CHs1 and pressure-reducing side characteristics CHs2 in consideration of "hysteresis in a relationship between the power supply amount and the pressing force" in the braking means BRK. The hysteresis will be described later.

The power supply amount is a state quantity (variable) to control an output torque of the electric motor MTR. The electric motor MTR, in order to output a torque being in almost proportion to a current, can use a current target value of the electric motor MTR as the target value of the power supply amount. When a supply voltage to the electric motor MTR increases, a current is increased consequently. For this reason, a supply voltage value may be used as the target power supply amount. Furthermore, since the supply voltage value can be adjusted by a duty ratio in pulse-width modulation, the duty ratio may be used as the power supply amount.

The target power supply amount Imt calculated on the basis of the calculation characteristics shown in FIG. 4 may be corrected on the basis of a "feedback amount calculated on the basis of the target pressing force (target value) Fbt calculated by the calculation block FBT (see FIG. 1) and the pressing force (actual value) Fba detected by the pressing force sensor FBA".

A rotating direction of the electric motor MTR is determined on the basis of the sign (positive/negative of the value) of the target power supply amount Imt, and an output (rotating power) of the electric motor MTR is calculated on the basis of the magnitude of the target power supply amount Imt. More specifically, when the sign of the target power supply amount Imt is positive (Imt>0), the electric motor MTR is driven in a normal rotating direction Fwd (increasing direction of the pressing force, see FIG. 3). When the sign of the Imt is negative (Imt<0), the electric motor MTR is driven in the reverse rotating direction Rvs (reducing direction of the pressing force, see FIG. 3). The output torque of the electric motor MTR is controlled such that the larger the absolute value of the target power supply amount Imt is, the larger the output torque of the electric motor MTR becomes, and is controlled such that the smaller the absolute value of the Imt is, the smaller the output torque becomes. According to this, the pressing force Fba (therefore, braking force) is adjusted depending on an operation of the brake operation member BP by a driver.

(Parking Brake Function)

The parking brake function is exerted by controlling the electric motor MTR and the solenoid SOL by the drive circuit DRV on the basis of the FLpk when the selecting block SLT selects the designation signal (control flag) FLpk. The parking brake has two operations including a "start operation" switching the parking brake from an inactive state to an active state and a "cancel operation" which switches the parking brake from the active state to the inactive state. The start and the cancel are determined on the basis of a change (0→1 or 1→0) of the designation signal FLpk.

In the start operation, the solenoid designation signal FLs designating the target power supply amount Imt and energization to the solenoid SOL for the start operation is output. In this case, the target power supply amount Imt for start operation is determined according to preset characteristics. The signal FLs is a control flag. "FLs=0" designates non-energization to the solenoid SOL, and "FLs=1" designates energization to the solenoid SOL.

More specifically, in the start operation, the DRV sets the target power supply amount Imt for start operation to a value (>0) depending on braking force necessary to keep the vehicle in a stopped state on a slope road. On the basis of the target power supply amount Imt (>0) for start operation, the electric motor MTR is driven in the normal rotating direction. In this manner, the pressing force Fba increases to a value (corresponding to the selected pressing force) depending on the braking force necessary to keep the vehicle in the stopped state on the slope road.

Thereafter, the signal FLs is switched from "0" to "1". For this reason, the claw member TSU moves from an "engagement impossible position" (see FIG. 3A) to an "engagement possible position" (FIG. 3B). As described above, in the state in which the pressing force Fba (>0) is generated and the TSU is kept in the engagement possible position, the target power supply amount Imt is reduced to rotate the RCH in the reverse rotating direction Rvs (see FIG. 3). For this reason, the distal end Tme of the TSU is engaged with the teeth of the RCH. With this engagement, rotating motion in the reverse rotating direction Rvs of the RCH becomes impossible, and the pressing force Fba is kept at a present value even though the energization to the electric motor MTR is stopped. Thereafter, the energization to the electric motor MTR is stopped. More specifically, the parking brake function is started/kept.

In the cancel operation, the DRV sets the target power supply amount Imt for cancel operation to a value (>0) necessary to drive the ratchet gear RCH in the normal rotating direction. In a state in which the distal end Tme of the TSU is engaged with the teeth of the RCH, the electric motor MTR is driven in the normal rotating direction on the basis of the target power supply amount Imt for cancel operation. When the RCH rotates in the forward rotating direction Fwd, the engagement between the distal end TMe of the TSU and the teeth of the RCH is canceled. As a result, with biasing force of the elastic member SPR, the TSU returns from the engagement possible position (see FIG. 3B) to the engagement impossible position (see FIG. 3A). According to this, the kept parking brake function is canceled.

(Automatic Pressurization Control Function)

An automatic pressurization control function is a brake function which generates braking force to achieve automatic pressurization control. The automatic pressurization control function is exerted by driving the electric motor MTR by the drive circuit DRV on the basis of the Fat (corresponding to the selected pressing force) when the selecting block SLT selects the target pressing force Fat.

More specifically, the DRV calculates the target power supply amount Imt for automatic pressurization control on the basis of the target pressing force Fat, by using one of known methods. The target power supply amount Imt for automatic pressurization control is a target value of a power supply amount for the electric motor MTR to achieve the target pressing force Fat. On the basis of the target power supply amount Imt for automatic pressurization control, an output (rotating power) from the electric motor MTR is controlled. According to this, the pressing force Fba (thus, braking force) is adjusted to achieve the automatic pressurization control.

(Hysteresis Characteristics)

Hysteresis characteristics as shown in FIG. 5 are inevitably generated between a "power supply amount (actual value) Ima for the electric motor MTR" and the "pressing force (actual value) Fba" due to friction or the like of a sliding part inside a "power transmitting mechanism" (the input INP, the decelerator GSK, the shaft member SFT, and the screw member NJB) in the braking means BRK. As an example, the hysteresis characteristics indicated by a bold solid line in FIG. 5 includes the pressure-increasing side characteristics CHS1 and the pressure-reducing side characteristics CHS2.

The characteristics CHI shown in FIG. 5 here are characteristics (to be referred to as "reference characteristics" hereinafter) uniquely obtained on the basis of only the specifications of the electric motor MTR and the "power transmitting mechanism" only when no hysteresis is present between the power supply amount Ima and the pressing force Fba. In the embodiment, the reference characteristics CHI can be expressed by the following Equation (1).

$$Fba = (K \cdot G/L) \cdot Ima \quad (1)$$

In Equation (1), "K" denotes a torque constant (Nm/A) of the electric motor MTR, "G" denotes a reduction ratio (dimensionless) of the decelerator GSK, and "L" denotes a lead (m/rad) of the screw member NJB.

In general, a frictional coefficient of a sliding part in the "power transmitting mechanism" inevitably varies due to aging, a change in temperature, and the like. Due to a variation or the like of the frictional coefficient, the hysteresis characteristics vary centering around the reference characteristics CHI. More specifically, on the graph shown in FIG. 5, when the frictional coefficient increases, the pressure-increasing side characteristics move from the CHI to the right and the pressure-reducing side characteristics move from the CHI to the left. For example, in a situation in which the above-described hysteresis characteristics indicated by the bold solid line in FIG. 5 can be obtained, when the frictional coefficient increases due to aging, a change in temperature, and the like, as indicated by a broken line in FIG. 5, the pressure-increasing side characteristics of the hysteresis characteristics move from CHS1 to CHW1 and the pressure-reducing side characteristics of the hysteresis characteristics move from CHS2 to CHW2.

(Power Supply Amount for Electric Motor MTR in Keeping State of Braking Force)

When the braking force is kept, due to the presence of the above-described "hysteresis between the power supply amount Ima and the pressing force Fba", the power supply amount Ima which can keep the braking force at a present value has ranges depending on the hysteresis characteristics. For example, as shown in FIG. 5, when the hysteresis characteristics include the pressure-increasing side characteristics CHS1 and the pressure-reducing side characteristics CHS2, the range of the power supply amount Ima which can keep the pressing force Fba at a value fba1 is expressed by Has (ims to imu).

Thus, when it is determined that the braking force is in the keeping state, in "terms of reduction in current consumption of the device without lowering the braking force", the power supply amount Ima may be preferably set to the minimum value (or a value slightly larger than the minimum value) in the range in which the braking force can be kept at the present value. The "minimum value in the range in which the braking force can be kept at the present value" may be simply called a "minimum value" hereinafter.

The "minimum value of the power supply amount" becomes a lower limit value ims in a range Has when the "hysteresis characteristics include the pressure-increasing side characteristics CHS1 and the pressure-reducing side characteristics CHS2", and becomes a lower limit value imw in a range Haw when the "hysteresis characteristics include the pressure-increasing side characteristics CHW1 and the pressure-reducing side characteristics CHW2".

More specifically, the "minimum value of the power supply amount" also varies depending on the variation in variation in hysteresis characteristic. In order to maximally reduce the current consumption of the device without lowering the braking force, the hysteresis characteristics (therefore, the minimum value of the power supply amount) which can vary every second as described above are sequentially detected and updated, and, each time it is determined that the braking force is in the keeping state, the power supply amount Ima may be preferably set to the latest "minimum value of the power supply amount" (or a value slightly larger than the minimum value).

On the basis of such knowledge, in the embodiment, each time a predetermined time point comes, the hysteresis characteristics are newly detected and stored. Examples of the "predetermined time point" include a time point when normal brake is applied by a driver and a time point when a parking brake is applied. When the normal brake or the parking brake is applied, on the basis of detection results of the pressing force sensor FBA and a sensor (not shown) detecting the power supply amount ima, a relationship between the power supply amount ima and the pressing force Fba varying every second is sequentially (every lapse of a very short time) detected to make it possible to newly acquire and update the hysteresis characteristics as shown in FIG. 5. The acquired and updated hysteresis characteristics are stored in a storage area in the ECU.

In the embodiment, each time it is determined that "the braking force is in the keeping state" (regardless whether the parking brake is being operated and the automatic pressurization control is being executed), the "minimum value of the power supply amount which can keep the present pressing force" from the stored latest hysteresis characteristics is acquired, and the target power supply amount Imt (therefore, the power supply amount Ima) for the electric motor MTR is set to the "minimum value of the power supply amount" (or a value slightly larger than the minimum value). The determination that "the braking force is in the keeping state" can be determined, for example, when a condition in which any one or two or more fluctuation margins of the pressing force Fba detected by the pressing force sensor FBA, the brake operation amount Bpa detected by the brake operation amount acquiring means BPA, a rotating angle Mka of the electric motor MTR detected by the position acquiring means MKA, the power supply amount ima detected by a sensor detecting the power supply amount ima, and a target power supply amount imt fall within a predetermined range over a predetermined time and the like are established. This determination is made by the ECU.

According to this, each time the predetermined time point comes, the hysteresis characteristics used for setting the power supply amount ima in the keeping state are gradually updated. Thus, the minimum value of the power supply amount ima within the range in which the present braking force can be kept can be relatively correctly acquired. On the basis of the minimum value of the power supply amount relatively correctly acquired as described above, the power supply amount ima in the keeping state is determined. As a result, the power supply amount is properly set in the keeping state to make it possible to reliably reduce a current consumption of the device without lowering braking force.

In the embodiment, independently of application of the normal brake or the parking brake, also when the "automatic hysteresis characteristic detection operation" (operation which changes a power supply amount only to detect new hysteresis characteristics) is performed, the hysteresis characteristics (more specifically, the minimum value of the power supply amount which can keep the present pressing force) are newly acquired.

The automatic hysteresis characteristic detection operation may be performed each time it is determined that the "braking force is in the keeping state". FIG. 6 shows an example of the operation performed in this case. In this example, the braking force is kept almost constant before time t1. As a result, at time t1, when it is determined that the "braking force is in the keeping state", the target power supply amount imt (therefore, the power supply amount ima) is gradually reduced to reduce the pressing force Fba.

For example, time t1, in the hysteresis characteristics indicated by the bold solid line in FIG. 5, it is assumed that the power supply amount ima is imu (=im1) and the pressing force Fba is fba1. In this case, after time t1, the power supply amount ima reduces from imu (=im1). However, the pressing force Fba is kept at fba1 until the power supply amount ima reaches ims (=im2).

At time t2, when the power supply amount ima reaches ims (=im2), each power transmitting member of the "power transmitting mechanism" begins to move in the reverse direction Rvs to start a reduction of the pressing force Fba from fba1. As a result, the rotating angle Mka of the electric motor MTR detected by the position acquiring means MKA begins to change (reduce). At time t3, when a variation (reduction) of the rotating angle Mka reaches a predetermined value Hm1, it is determined that the "rotating angle Mka changes (reduces)". The power supply amount Ima at a time point when the determination is made is stored as a minimum value im3 of the power supply amount to keep the present braking force.

In this manner, when the automatic hysteresis characteristic detection operation is performed, in order to acquire the minimum value of the power supply amount, braking force (pressing force) is actually reduced from a "kept value". In consideration of the hysteresis characteristics, when the braking force reduces as described above, by merely setting the power supply amount to the acquired minimum value (or a value slightly larger than the minimum value) of the power supply amount, a situation in which a reduction in braking force still continues may occur.

In the example shown in FIG. 5 described above, in the state in which pressing force Fba reduces from fba1, even though the power supply amount ima is set to ims (or a value slightly larger than ims), due to the hysteresis characteristics, the state in which pressing force Fba reduces from fba1 is kept. The pressing force Fba is preferably returned to the value (fba1) obtained when it is determined that "braking force is in the keeping state".

In consideration of this point, in an example shown in FIG. 6, at time t3, after the minimum value im3 of the power supply amount is acquired, the power supply amount ima is increased again. When the power supply amount ima reaches im1 at time t4, the pressing force Fba is returned to a value obtained when it is determined that the "braking force is in the keeping state", thereafter, the power supply amount ima is kept at a value (im3+hi1) obtained by adding a predetermined value (minute value) hi1 to the above-described "stored minimum value im3 of the power supply amount". In the example shown in FIG. 6, when it is detected that power supply amount ima reaches im1, the power supply amount ima is set to (im3+hi1) (time t4). However, when it is detected that the pressing force Fba returns to fba1, the power supply amount ima may be set to (im3+hi1).

According to this, after the automatic hysteresis characteristic detection operation is performed, the reducing braking force can be reliably returned to a "kept value".

In the example shown in FIG. 6, although the power supply amount ima obtained when it is determined that the "rotating angle Mka changes (reduces)" is acquired as the minimum value of the power supply amount, as shown in FIG. 7, in place of the rotating angle Mka, the power supply amount ima obtained when it is determined that the pressing force Fba detected by the pressing force sensor FBA changes (reduces) may be acquired as the minimum value of the power supply amount. In the example shown in FIG. 7, when the variation (reduction) of the pressing force Fba reaches a predetermined value Hf1, it is determined that the "pressing force Fba changes (reduces)".

In the embodiment, when it is determined that the "braking force is in the keeping state", the "pressing force increasing control" adjusting the pressing force to a value larger than the "selected pressing force" is performed, and, thereafter, the automatic hysteresis characteristic detection operation may be performed. For example, in the example shown in FIG. 8, in hysteresis characteristics CHS indicated by a bold solid line in FIG. 8, in a state (point P) in which the power supply amount ima is imu and the pressing force Fba is fba1 (=selected pressing force), when it is determined that the "braking force is in the keeping state", it is assumed that a state (point Q) in which the "pressing force increasing control" is executed to increase the power supply amount ima from imu to imu2 and to increase the pressing force Fba from fba1 to fba2 is set. In this state (point Q), the automatic hysteresis characteristic detection operation is performed.

In this case, in order to acquire the minimum value of the power supply amount, the pressing force Fba is actually reduced from the "kept value fba2". At this time (i.e., in a process in which the power supply amount ima gradually reduces), as indicated by a bold broken line in FIG. 8, the power supply amount ima is preferably adjusted such that the pressing force Fba is not lower than the selected pressing force fba1 (fmin≥fba1). In this manner, when the automatic hysteresis characteristic detection operation is performed, a situation in which the braking force (pressing force) is lower than the "selected pressing force" can be prevented from occurring.

In the embodiment, as described above, the electric braking device is mounted on each of the wheels. In the embodiment, when it is determined that the "braking force is in the keeping state", the automatic hysteresis characteristic detection operation is preferably prevented from being simultaneously executed to all the electric braking devices (therefore, all the wheels). More specifically, for example, when it is determined once that the "braking force is in the keeping state", the automatic hysteresis characteristic detection operation is executed to only some wheels of all the wheels first, and, upon completion of the automatic hysteresis characteristic detection operation, the automatic hysteresis characteristic detection operation is preferably started and executed to the remaining wheels. Alternatively, each time it is determined that the "braking force is in the keeping state", the automatic hysteresis characteristic detection operation is executed to only some wheels of all the wheels. Each time it is determined that the "braking force is in the keeping state", wheels to which the automatic hysteresis characteristic detection operation is executed are preferably changed.

A case in which, although the electric braking device is not mounted on each of the wheels, a vehicle includes a plurality of the electric braking devices will be assumed. More specifically, for example, a configuration in which a first electric braking device includes a first fluid pressure circuit to control braking force for any two wheels (two wheels of a first group) of four wheels as a part of the "power transmitting mechanism" and a second electric braking device includes a second fluid pressure circuit (different from the first fluid pressure circuit) to control braking force for the remaining two wheels (two wheels of a second group) as a part of the "power transmitting control device" is assumed. In this case, for example, when it is determined once that the "braking force is in the keeping state", the automatic hysteresis characteristic detection operation is executed to only the two wheels of the first group first, and, upon completion of the automatic hysteresis characteristic detection operation, the automatic hysteresis characteristic detection operation is preferably started and executed to the two wheels of the second group. Alternatively, each time it is determined that the "braking force is in the keeping state", the automatic hysteresis characteristic detection operation is executed to only two wheels of any one of the first and second groups. Each time it is determined that the "braking force is in the keeping state", a group to which the automatic hysteresis characteristic detection operation is executed is preferably changed.

As described above, when the automatic hysteresis characteristic detection operation is performed to a certain wheel, in order to acquire the minimum value of the power supply amount, braking force for the wheel is actually reduced from the "kept value". Thus, when the automatic hysteresis characteristic detection operation is simultaneously performed to all the wheels of a vehicle, a reduction in braking force for the entire vehicle increases. In contrast to this, according to the configuration, the automatic hysteresis characteristic detection operation is not simultaneously executed to all the wheels of the vehicle. Thus, a reduction in braking force for an entire vehicle can be made relatively small.

In the embodiment, the automatic hysteresis characteristic detection operation is preferably designed to be executed only when it is determined that the vehicle is stopped. It is determined on the basis of a detection result of the vehicle speed acquiring means VXA that the vehicle is stopped.

As described above, when the automatic hysteresis characteristic detection operation is performed, the braking force is actually reduced from the "kept value". Thus, when the automatic hysteresis characteristic detection operation is performed while the vehicle is traveling (in particular, during deceleration by normal braking), an occupant of the vehicle easily is aware that the braking force reduces. The above configuration is based on such knowledge. According to this, a "situation in which the occupant of the vehicle is aware that the automatic hysteresis characteristic detection operation is performed while the vehicle is traveling" can be prevented from occurring.

In the embodiment, when it is determined that the "braking force is in the keeping state", the power supply amount ima in the keeping state can be set without performing the automatic hysteresis characteristic detection operation, on the basis of the "reference characteristics CHI" (see FIG. 5).

More specifically, the power supply amount ima in the keeping state may be set to a "value corresponding to the present pressing force Fba in the reference characteristics CHI". Alternatively, the power supply amount ima in the keeping state may be set to a value corresponding to the present pressing force Fba in "characteristics obtained by shifting the reference characteristics CHI by a magnitude corresponding to a range of the minimum hysteresis characteristics within an assumable range in a reducing direction of the power supply amount ima (to the left in FIG. 5)" (i.e., pressure-reducing side characteristics in hysteresis characteristics in which the range of the hysteresis characteristics is minimum within an assumable range).

In this manner, the power supply amount ima in the keeping state can be set on the basis of the "reference characteristics CHI" for the following reason. That is, as described above, due to a variation or the like of a frictional coefficient of a sliding part in the power transmitting mechanism, the hysteresis characteristics vary centering around the "reference characteristics CHI" (in FIG. 5, in the horizontal directions). Thus, the "power supply amount ima corresponding to the present pressing force Fba in the reference characteristics CHI" must be larger than the "minimum value of the power supply amount within a range in which the present pressing force Fba can be kept when the hysteresis characteristics are considered".

In other words, when the power supply amount Ima in the keeping state is set to the "value corresponding to the present pressing force Fba in the reference characteristics CHI", a situation in which the pressing force Fba is lower than the present pressing force can be reliably prevented from occurring. In addition, in comparison with a case in which the power supply amount Ima in the keeping state is kept at a value close to the "maximum value of the power supply amount within the range in which the present pressing force Fba can be kept", a current consumption of the device can be reliably reduced.

In this manner, when the "power supply amount ima in the keeping state" is set on the basis of the "reference characteristics CHI", the set "power supply amount ima in the keeping state" may be corrected on the basis of the temperature of the electric motor MTR. This is based on the following reason.

In general, the higher the temperature of the electric motor is, the lower a "ratio of an output torque to a power supply amount" in the electric motor (=a torque constant K in the above Equation (1)) becomes. This is because, the higher the temperature of the electric motor, the lower a magnetic flux density of a permanent magnet in the electric motor becomes. Therefore, as shown in FIG. 9, when the temperature of the electric motor is high (low), the "reference characteristics CHI" determined on the basis of a torque constant K moves to the right (to the left) in FIG. 9. Thus, according to the configuration, regardless of the temperature of the electric motor, the "power supply amount ima in the keeping state" can be correctly set on the basis of the correct "reference characteristics CHI".

More specifically, for example, when the temperature (reference temperature) of the electric motor MTR corresponding to the reference characteristics CHI stored in the ECU is known, the reference characteristics CHI is corrected on the basis of a difference between the reference temperature and the present temperature of the electric motor MTR, and the "power supply amount ima in the keeping state" may be set on the basis of the corrected reference characteristics CHI.

The invention claimed is:

1. An electric braking device for a vehicle comprising:
   an electric motor generating power;
   a pressing member pressing a friction member against a rotating member integrally rotating together with a wheel of the vehicle;
   a power transmitting mechanism configured to transmit the power generated by the electric motor to the pressing member and cause pressing force to be generated by the pressing member with respect to the friction member, the power transmitting mechanism including a power transmitting member; and
   a controller controlling a power supply amount for the electric motor such that, of pressing force determined on the basis of an operation of a brake operation member of the vehicle by a driver, pressing force determined on the basis of a parking brake function, and pressing force determined by an automatic pressurization control generating braking force regardless of the operation of the brake operation member, selected pressing force serving as pressing force selected on the basis of conditions of the vehicle is generated, wherein
   the controller is configured to
   determine whether a keeping state in which the pressing force generated by the pressing member with respect to the friction member is kept constant is set,
   detect hysteresis characteristics in a relationship between the power supply amount and the pressing force each time a predetermined time point comes, and
   when it is determined that the keeping state is set, on the basis of the detected hysteresis characteristics, acquire a minimum value of the power supply amount at which the current pressing force can be kept, and set the power supply amount for the electric motor to a value determined on the basis of the acquired minimum value of the power supply amount.

2. The electric braking device for a vehicle according to claim 1, further comprising:
   a position sensor detecting a position of the electric motor or the power transmitting member, wherein
   the controller is configured such that
   when it is determined that the keeping state is set, the power supply amount for the electric motor is gradually reduced to reduce the pressing force, and the minimum value of the power supply amount is acquired on the basis of a change of the detected position.

3. The electric braking device for a vehicle according to claim 1, further comprising:
   a pressing force sensor detecting the pressing force, wherein
   the controller is configured such that
   when it is determined that the keeping state is set, the power supply amount for the electric motor is gradually reduced to reduce the pressing force, and the minimum value of the power supply amount is acquired on the basis of a change of the detected pressing force.

4. The electric braking device for a vehicle according to claim 2, wherein the controller,
   after the minimum value of the power supply amount is acquired, increases the power supply amount for the electric motor to return the pressing force to a value obtained when it is determined that the keeping state is set, and, thereafter, sets the power supply amount for the electric motor to the value determined on the basis of the acquired minimum value of the power supply amount.

5. The electric braking device for a vehicle according to claim 2, wherein the controller is configured to execute pressing force increasing control to adjust the pressing force to a value larger than that of the selected pressing force, the controller, when it is determined that the keeping state is set, executes the pressing force increasing control, thereafter, executes control for reducing the power supply amount to acquire the minimum value of the power supply amount, and, in execution of the control for reducing the power supply amount, adjusts the power supply amount to prevent the pressing force from being lower than the selected pressing force.

6. The electric braking device for a vehicle according to claim 2, wherein the vehicle includes a plurality of the electric braking devices, when it is determined that the keeping state is set, control for reducing the power supply amount to acquire the minimum value of the power supply amount is not simultaneously executed to all the electric braking devices.

7. The electric braking device for a vehicle according to claim 2, wherein the controller is configured to execute control for reducing the power supply amount to acquire the minimum value of the power supply amount only when it is determined that the vehicle stops.

8. The electric braking device for a vehicle according to claim 3, wherein the controller, after the minimum value of the power supply amount is acquired, increases the power supply amount for the electric motor to return the pressing force to a value obtained when it is determined that the keeping state is set, and, thereafter, sets the power supply amount for the electric motor to the value determined on the basis of the acquired minimum value of the power supply amount.

9. The electric braking device for a vehicle according to claim 3, wherein the controller is configured to execute pressing force increasing control to adjust the pressing force to a value larger than that of the selected pressing force, the controller, when it is determined that the keeping state is set, executes the pressing force increasing control, thereafter, executes control for reducing the power supply amount to acquire the minimum value of the power supply amount, and, in execution of the control for reducing the power supply amount, adjusts the power supply amount to prevent the pressing force from being lower than the selected pressing force.

10. The electric braking device for a vehicle according to claim 3, wherein the vehicle includes a plurality of the electric braking devices, when it is determined that the keeping state is set, control for reducing the power supply amount to acquire the minimum value of the power supply amount is not simultaneously executed to all the electric braking devices.

11. The electric braking device for a vehicle according to claim 3, wherein the controller is configured to execute control for reducing the power supply amount to acquire the minimum value of the power supply amount only when it is determined that the vehicle stops.

\* \* \* \* \*